US011111032B2

(12) United States Patent
Clampitt, III et al.

(10) Patent No.: US 11,111,032 B2
(45) Date of Patent: Sep. 7, 2021

(54) SYSTEMS AND METHODS FOR MONITORING THE HEALTH OF A ROTATING MACHINE

(71) Applicant: Honeywell International Inc., Morris Plains, NJ (US)

(72) Inventors: Norman Cornelius Clampitt, III, Long Beach, CA (US); Mohit Singhai, Chandler, AZ (US); Thomas Mark MacRunnel, Lomita, CA (US); Aerwin Perez, Azusa, CA (US); Kelsey Keberle, Morris Plains, NJ (US)

(73) Assignee: Honeywell International Inc., Charlotte, NC (US)

( * ) Notice: Subject to any disclaimer, the term of this patent is extended or adjusted under 35 U.S.C. 154(b) by 242 days.

(21) Appl. No.: 16/375,171

(22) Filed: Apr. 4, 2019

(65) Prior Publication Data
US 2020/0317367 A1 Oct. 8, 2020

(51) Int. Cl.
B64D 45/00 (2006.01)
G07C 5/08 (2006.01)

(52) U.S. Cl.
CPC ........... B64D 45/00 (2013.01); G07C 5/0808 (2013.01); B64D 2045/0085 (2013.01)

(58) Field of Classification Search
CPC ............ B64D 45/00; B64D 2045/0085; G07C 5/0808; G07C 5/008; G07C 5/0825
See application file for complete search history.

(56) References Cited

U.S. PATENT DOCUMENTS

| 6,116,089 | A  | * | 9/2000  | El-Ibiary | G01H 1/003 73/593 |
| 6,260,004 | B1 | * | 7/2001  | Hays | F04D 15/0088 702/183 |
| 6,980,910 | B1 | * | 12/2005 | Shen | G01H 1/003 702/183 |
| 9,090,339 | B2 |   | 7/2015  | Arms et al. | |

(Continued)

OTHER PUBLICATIONS

Prateek Saxena et al., "Fault Diagnostics and Health Monitoring of Machines Using Wireless Condition Monitoring Systems", International Journal of Scientific & Engineering Research, vol. 6, Issue 4, Apr. 2015, pp. 178-182.

Primary Examiner — Michael J Zanelli
(74) Attorney, Agent, or Firm — Bookoff McAndrews, PLLC

(57) ABSTRACT

A method for monitoring the health of a rotating machine mounted on a vehicle is disclosed. The method may include: receiving identifying information of the vehicle, the rotating machine, and a portable vibration sensor mounted on the rotating machine; receiving vibration data from the portable vibration sensor during a test of the rotating machine, the received vibration data being associated with the identifying information of the vehicle, the rotating machine, and the portable vibration sensor; comparing the received vibration data with known vibration data for the rotating machine; generating an alert if the received vibration data exceeds a predetermined threshold value of the known vibration data; generating a health report for the rotating machine based on the received vibration data; and transmitting the health report to a user via a web portal.

20 Claims, 9 Drawing Sheets

(56) References Cited

U.S. PATENT DOCUMENTS

| | | | |
|---|---|---|---|
| 2012/0330495 A1* | 12/2012 | Geib | F01D 21/003 |
| | | | 701/29.6 |
| 2016/0041068 A1* | 2/2016 | Wascat | H04W 4/70 |
| | | | 702/39 |
| 2016/0055685 A1* | 2/2016 | Lilly | G07C 5/0825 |
| | | | 701/1 |
| 2017/0015151 A1 | 1/2017 | Bill | |
| 2017/0178030 A1 | 6/2017 | Pal | |
| 2017/0219421 A1* | 8/2017 | Takahashi | G01N 29/4454 |
| 2018/0052068 A1 | 2/2018 | Nicks et al. | |
| 2018/0165897 A1* | 6/2018 | Hale | G07C 5/0825 |
| 2018/0284735 A1* | 10/2018 | Celia | G05B 19/41865 |
| 2019/0312957 A1* | 10/2019 | Redmond | G08G 5/0052 |

* cited by examiner

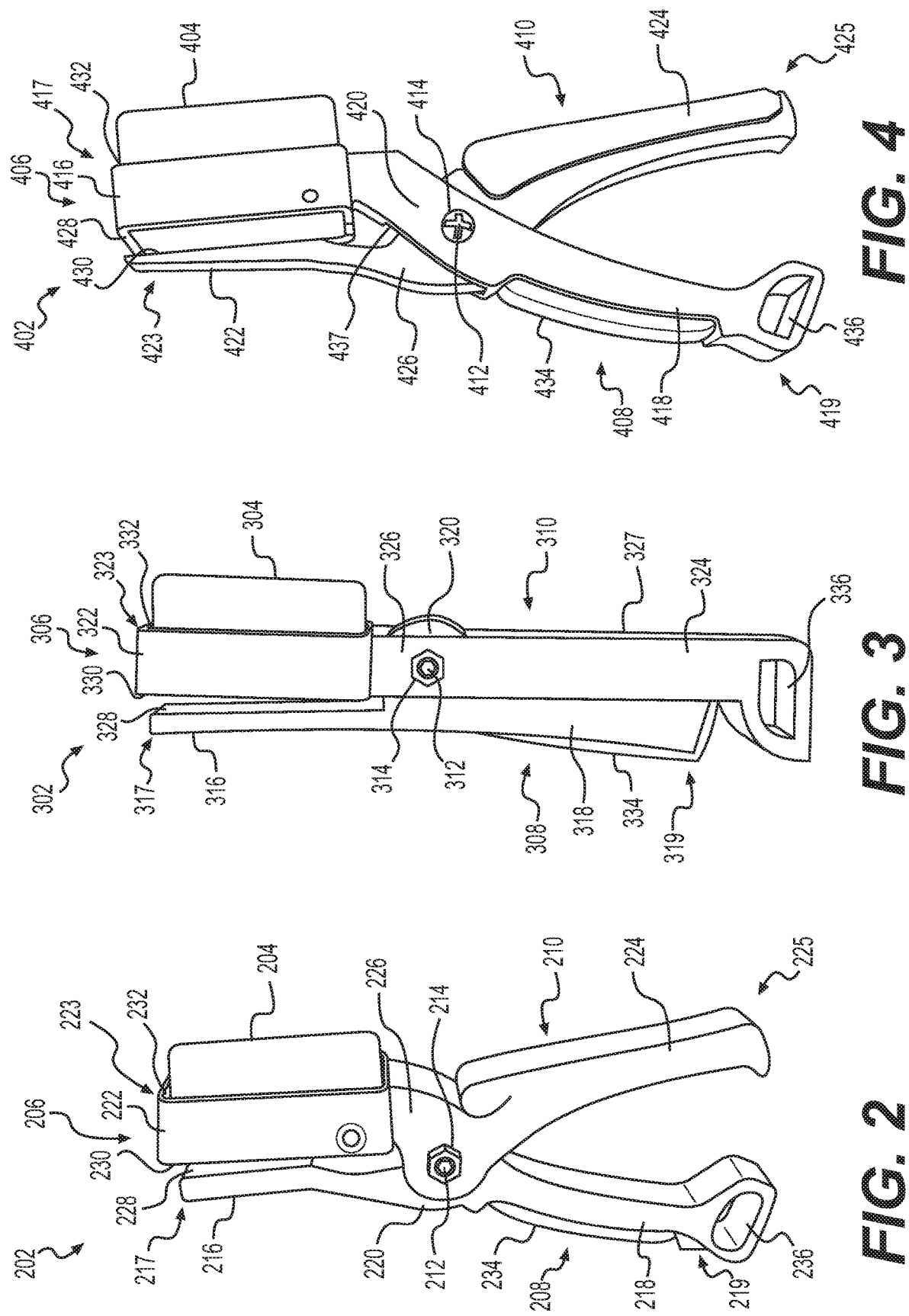

600

```
┌─────────────────────────────────────────────────────────────┐
│ RECEIVE, BY A PROCESSOR, IDENTIFYING INFORMATION OF A       │
│ VEHICLE, A ROTATING MACHINE, AND A PORTABLE VIBRATION       │
│ SENSOR MOUNTED ON THE ROTATING MACHINE                      │
└─────────────────────────────────────────────────────────────┘
                              │
                             605
                              ▼
┌─────────────────────────────────────────────────────────────┐
│ RECEIVE, BY THE PROCESSOR, VIBRATION DATA FROM THE PORTABLE │
│ VIBRATION SENSOR DURING A TEST OF THE ROTATING MACHINE, THE │
│ RECEIVED VIBRATION DATA BEING ASSOCIATED WITH THE           │
│ IDENTIFYING INFORMATION OF THE VEHICLE, THE ROTATING        │
│ MACHINE, AND THE PORTABLE VIBRATION SENSOR                  │
└─────────────────────────────────────────────────────────────┘
                              │
                             610
                              ▼
┌─────────────────────────────────────────────────────────────┐
│ COMPARING, BY THE PROCESSOR, THE RECEIVED VIBRATION         │
│ DATA WITH KNOWN DATA FOR THE ROTATING MACHINE               │
└─────────────────────────────────────────────────────────────┘
                              │
                             615
                              ▼
┌─────────────────────────────────────────────────────────────┐
│ GENERATE, BY THE PROCESSOR, AN ALERT IF THE RECEIVED        │
│ VIBRATION DATA EXCEEDS A PREDETERMINED THRESHOLD VALUE OF   │
│ KNOWN VIBRATION DATA                                        │
└─────────────────────────────────────────────────────────────┘
                              │
                             620
                              ▼
┌─────────────────────────────────────────────────────────────┐
│ GENERATE, BY THE PROCESSOR, A HEALTH REPORT FOR THE ROTATING│
│ MACHINE BASED ON THE RECEIVED VIBRATION DATA, THE HEALTH    │
│ REPORT INCLUDING THE RECEIVED VIBRATION DATA ASSOCIATED     │
│ WITH THE IDENTIFYING INFORMATION OF THE VEHICLE, THE ROATING│
│ MACHINE, AND THE PORTABLE VIBRATION SENSOR, THE HEALTH      │
│ REPORT FURTHER INCLUDING THE GENERATED ALERT                │
└─────────────────────────────────────────────────────────────┘
                              │
                             625
                              ▼
┌─────────────────────────────────────────────────────────────┐
│ TRANSMIT, BY THE PROCESSOR, THE HEALTH REPORT               │
│ TO A USER VIA A WEB PORTAL                                  │
└─────────────────────────────────────────────────────────────┘
                             630
```

FIG. 6

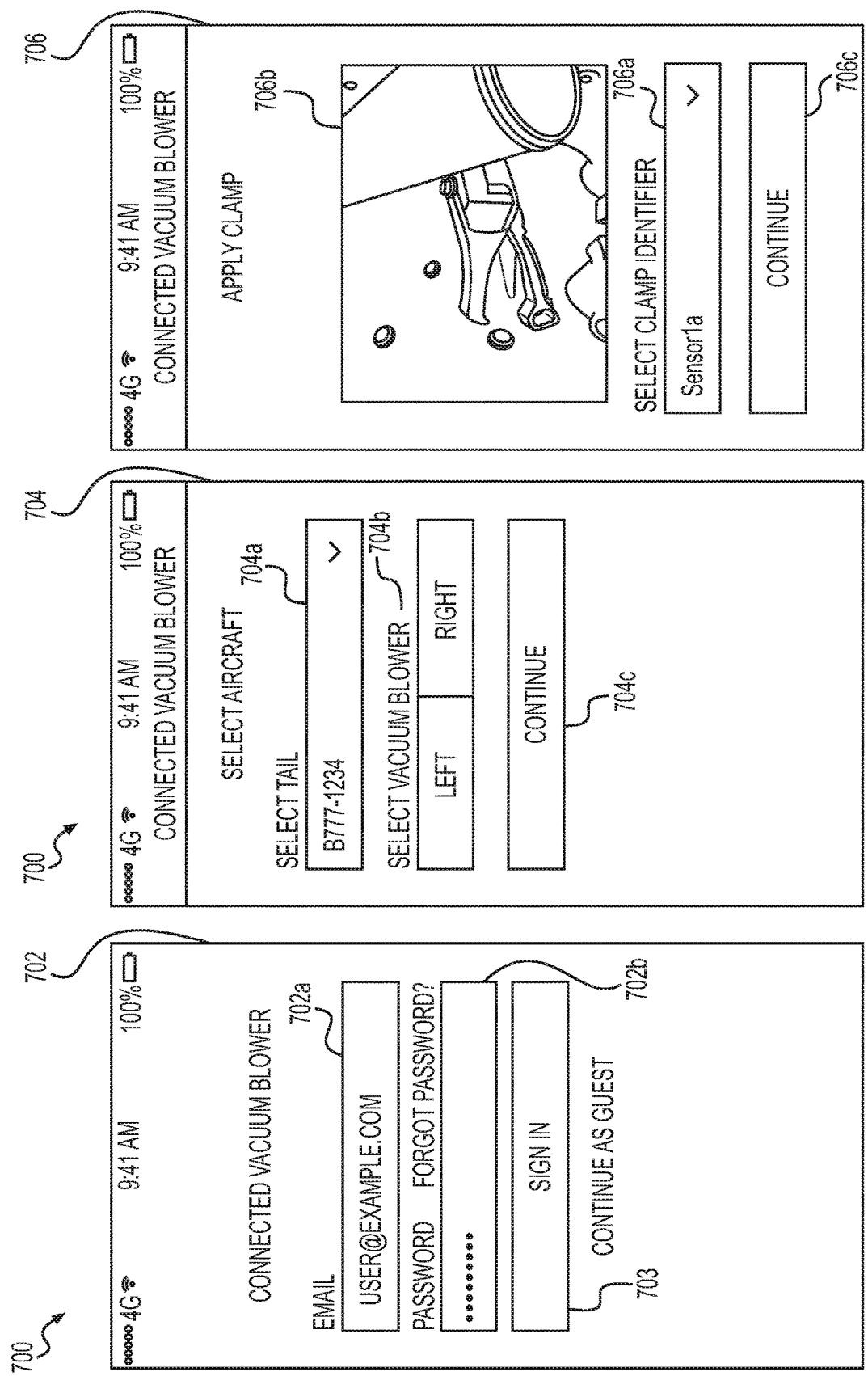

CONNECTED VACUUM BLOWER WEB

BACK TO INDEX

VEHICLE 1   VEHICLE 2   VEHICLE 3

VEHICLE 3

| STATUS ∨ | | | | | SEARCH 🔍 | |
|---|---|---|---|---|---|---|
| LAST DATA | TAIL NO. | SENSOR ID | LEFT VACUUM BLOWER | RIGHT VACUUM BLOWER | | ACTIONS |
| 4:55pm 05/21/18 | 1234 | Sensor1a | ● 1.8g | ○ 1.9g | | VIEW FULL REPORT |
| 5:21pm 05/21/18 | 5678 | Sensor2b | ○ 2.1g | ○ 2.0g | | VIEW FULL REPORT |
| 2:15pm 05/21/18 | 4321 | Sensor3a | ○ 1.6g | ○ 1.7g | | VIEW FULL REPORT |
| 6:01pm 05/21/18 | 8765 | Sensor4b | ○ 2.0g | ○ 2.2g | | VIEW FULL REPORT |

FIG. 8A

SYSTEMS AND METHODS FOR MONITORING THE HEALTH OF A ROTATING MACHINE

TECHNICAL FIELD

Various embodiments of the present disclosure generally relate to sensing and managing rotating machines and, more particularly, to systems and methods for monitoring the health of a rotating machine mounted on a vehicle.

BACKGROUND

Rotating machines are used in a variety of industrial and transportation applications. Rotating machines may be machines that including rotating members and are relied upon for numerous functions including drive shafts, fans, belt drives, pumps, rotors, etc. Because rotating machines often involve high service lives, heavy hourly usage, heavy loads, and/or fast rotational speeds, rotating machines can fail without warning.

In a vehicular or aviation environment, components (e.g., rotating members) can fail within rotating machines mounted on those vehicles, such as within a vacuum blower for the waste system of a commercial aircraft. For example, foreign objects may enter and damage the vacuum blower such that minor leaks may occur in the waste system. Minor leaks may go unnoticed by aircraft maintenance personnel until the leaks cause failure of the waste system. When the waste system fails due to leaks or other causes, the vacuum blower may need to be removed for maintenance and/or replacement. Unscheduled removal of the vacuum blower may cause expensive business interruptions such as delays and cancellations of flights.

The present disclosure is directed to overcoming one or more of these above-referenced challenges.

SUMMARY OF THE DISCLOSURE

According to certain aspects of the disclosure, systems and methods are disclosed for monitoring the health of a rotating machine In one aspect, a computer-implemented method for monitoring the health of a rotating machine mounted on a vehicle is disclosed. The method may include: receiving, by a processor, identifying information of the vehicle, the rotating machine, and a portable vibration sensor mounted on the rotating machine; receiving, by the processor, vibration data from the portable vibration sensor during a test of the rotating machine, the received vibration data being associated with the identifying information of the vehicle, the rotating machine, and the portable vibration sensor; comparing, by the processor, the received vibration data with known vibration data for the rotating machine; generating, by the processor, an alert if the received vibration data exceeds a predetermined threshold value of the known vibration data; generating, by the processor, a health report for the rotating machine based on the received vibration data, the health report including the received vibration data associated with the identifying information of the vehicle, the rotating machine, and the portable vibration sensor, the health report further includes the generated alert; and transmitting, by the processor, the health report to a user via a web portal.

In another aspect, a system for monitoring the health of a rotating machine mounted on a vehicle is disclosed. The system may include: a memory having processor-readable instructions therein; and at least one processor configured to access the memory and execute the processor-readable instructions, which when executed by the processor configures the processor to perform a plurality of functions, including functions for: receiving, by the processor, identifying information of the vehicle, the rotating machine, and a portable vibration sensor mounted on the rotating machine; receiving, by the processor, vibration data from the portable vibration sensor during a test of the rotating machine, the received vibration data being associated with the identifying information of the vehicle, the rotating machine, and the portable vibration sensor; comparing, by the processor, the received vibration data with known vibration data for the rotating machine; generating, by the processor, an alert if the received vibration data exceeds a predetermined threshold value of the known vibration data; generating, by the processor, a health report for the rotating machine based on the received vibration data, the health report including the received vibration data associated with the identifying information of the vehicle, the rotating machine, and the portable vibration sensor, the health report further includes the generated alert; and transmitting, by the processor, the health report to a user via a web portal.

In yet another aspect, a non-transitory computer-readable medium containing instructions for monitoring the health of a rotating machine mounted on a vehicle is disclosed. The instructions may include: receiving, by a processor, identifying information of the vehicle, the rotating machine, and a portable vibration sensor mounted on the rotating machine; receiving, by the processor, vibration data from the portable vibration sensor during a test of the rotating machine, the received vibration data being associated with the identifying information of the vehicle, the rotating machine, and the portable vibration sensor; comparing, by the processor, the received vibration data with known vibration data for the rotating machine; generating, by the processor, an alert if the received vibration data exceeds a predetermined threshold value of the known vibration data; generating, by the processor, a health report for the rotating machine based on the received vibration data, the health report including the received vibration data associated with the identifying information of the vehicle, the rotating machine, and the portable vibration sensor, the health report further includes the generated alert; and transmitting, by the processor, the health report to a user via a web portal.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 2-4 depict various embodiments of an exemplary portable vibration sensor, respectively, of system 100.

FIG. 6 depicts a flowchart of a method for monitoring the health of a rotating machine mounted on a vehicle of the system of FIG. 1.

FIGS. 7A-7G depict an exemplary user interface of an application for a mobile computing device used for the system of FIG. 1.

FIGS. 8A-8B depict an exemplary web portal for displaying a health report of the rotating machine of the system of FIG. 1.

DETAILED DESCRIPTION

Figure 1:
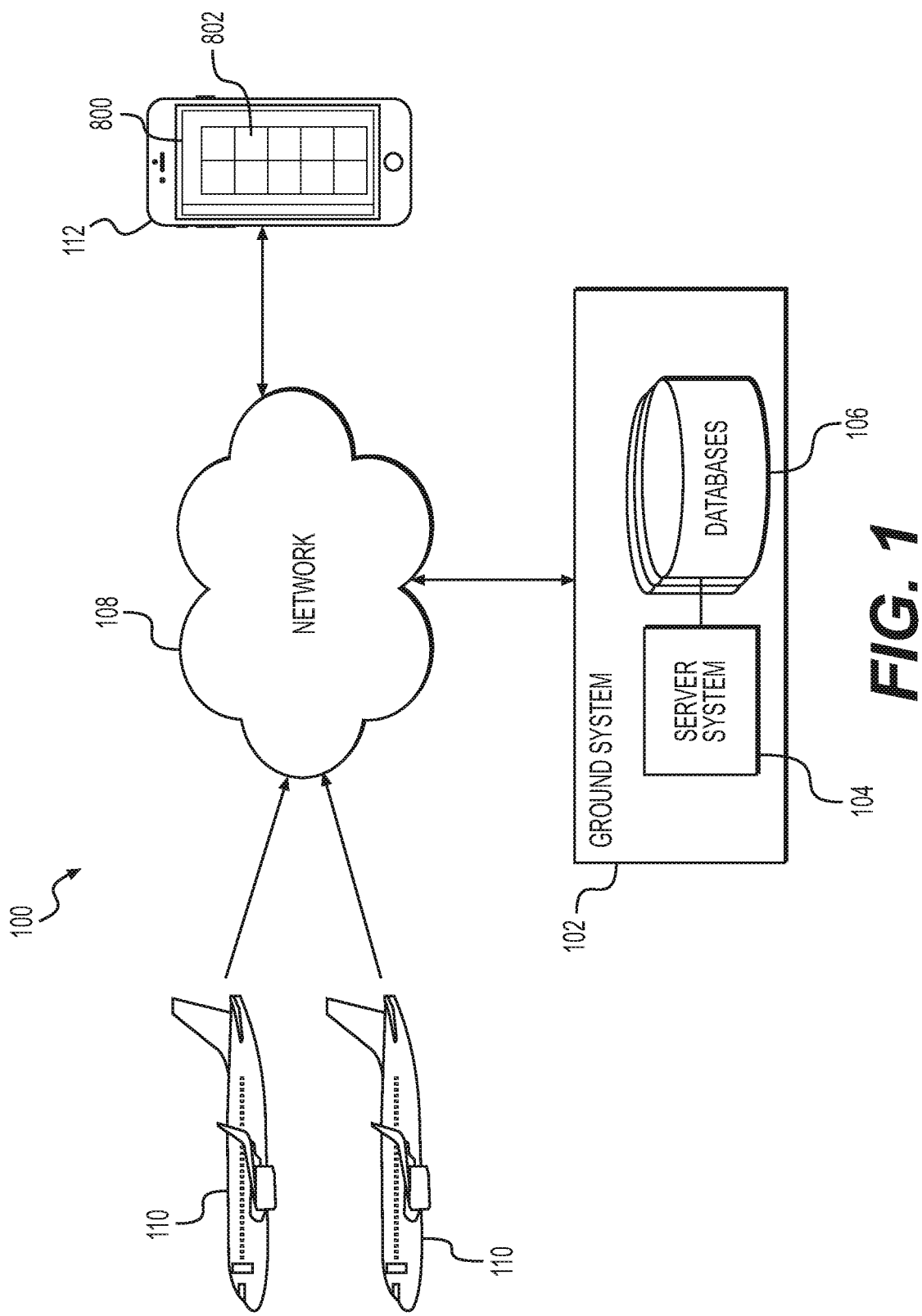
FIG. 1 depicts a block diagram of a system for monitoring the health of a rotating machine mounted on a vehicle, according to one or more embodiments.

The following embodiments describe systems and methods for monitoring the health of a rotating machine mounted on or part of any type of industrial system or machine, such as a vehicle. As used herein, a "rotating machine" may include any type of machine having at least one rotating member, such as drive shafts, fans, belt drives, pumps, rotors, etc. A "rotating machine" may further include the rotating member (fan, blower, etc.) of the rotating machine. As described above, there is a need to detect when a rotating member or rotating machine (e.g., a vacuum blower) on a vehicle is likely to fail prior to the machine failing, to avoid costly delays and cancellations. In general, the present disclosure is directed to generating and providing a health report of a rotating machine (e.g., a machine having a rotating member) in a vehicle. Embodiments of the present disclosure provide for a wireless portable vibration sensor and/or temperature sensor to measure vibrations and/or temperature of the rotating machine. For aircraft, maintenance personnel may apply the wireless portable vibration sensor and/or temperature sensor to the rotating machine during maintenance activity on the ground. The rotating machine may be run on the aircraft on the ground to measure health of the rotating machine. Vibration data may be transmitted wirelessly to receivers on the ground, which may collect and retransmit the data to a system capable of storing, analyzing, summarizing, and presenting the data to consumers of the data, such as operators and a manufacturer of the rotating machine.

The portable vibration sensor may include a set of clamps to allow a maintenance technician to mount, or clamp, the portable vibration sensor on to the rotating machine. The sensor may utilize a vibration signature of the rotating machine to measure health of the rotating machine. The system may provide an alert (via email and/or web portal) when the measured vibration signature exceeds an operational threshold of the rotating machine. The vibration signature data and observations may be recorded by a mobile application. The data may be automatically and securely uploaded to a cloud-based platform where analytics may be executed to generate the health reports.

In some embodiments, to collect the vibration signature data, a maintenance technician may board the vehicle, place the portable vibration sensor on the rotating machine and use a mobile application to run a test. Before initiating the test, the technician may input identifying information of the vehicle, the portable vibration sensor, and the rotating machine. The portable vibration sensor may record the vibration signature when the rotating machine is run and automatically send data of the vibration signature to the cloud-based platform. The above steps may be performed for each test on a plurality of rotating machines.

The rotating machine analytics of the data may be accessed via a secured web portal. For example, a landing page of the web portal may display drill-down dashboards for each vehicle (e.g., a fleet of aircraft). Detailed and accurate health reports may be generated and available for each rotating machine.

Embodiments may further provide for a mobile application for tagging (e.g., inputting) identifying information for each ground test of each rotating machine. The mobile application may be used to begin a test on a respective rotating machine. The portable vibration sensor may collect raw vibration data and send the collected raw vibration data to the cloud-based platform. The cloud-based platform may further perform analytics on the raw vibration data to generate a health report for the rotating machine. The health report may be published on the web portal using the identifying information for the tagged information (e.g., identifying information of the vehicle, portable vibration sensor, and rotating machine) and the sensor data associated with the tagged information. Maintenance technicians may view the health report and order the rotating machine or component to be replaced within a certain number of days before it causes disruption.

While the present embodiments are described in relation to a vacuum pump, for example, it should be appreciated that the present embodiments are relevant to the detection of vibrations in any rotating machine, such as a drive shaft, turbine, pump, impeller, motor, fan, rotor, or any other vibrating body. Moreover, while the present embodiments are described in relation to a rotating machine on an aircraft, it should be appreciated that the present embodiments are relevant to the detection and transmission of the health of any other type of machine, vehicle, or industrial system/machine. Thus, the embodiments of the present disclosure described herein may provide mechanical health data to identify trends in individual machines on various vehicles or machines. Further, the embodiments of the present disclosure may help to prevent expensive delays and cancellations. Manufacturers may also gain insight into mechanical health of a fleet of aircraft and any issues emerging in the field, as well as more detail about actual operation of the equipment in the field.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

Referring now to the appended drawings, FIG. 1 depicts a block diagram of a system 100 for monitoring the health of a rotating machine mounted within or on a vehicle, according to one or more embodiments. In general, system 100 comprises a plurality of vehicles, e.g., aircraft 110, mobile computing devices 112, and a ground system 102 all disposed in communication with each other via a network 108, such as the Internet.

As shown in FIG. 1, ground system 102 may include a server system 104 and one or more databases 106. The server system 104 may include one or more processors configured to execute instructions for monitoring the health of a rotating machine, as further detailed below. The server system 104 may include an application program interface (API) server, web page servers, processing servers, analytics servers, or any other types of front-end or back-end servers. Ground system 102 may be connected to a network 108, such as a cloud-based network.

Figure 5:
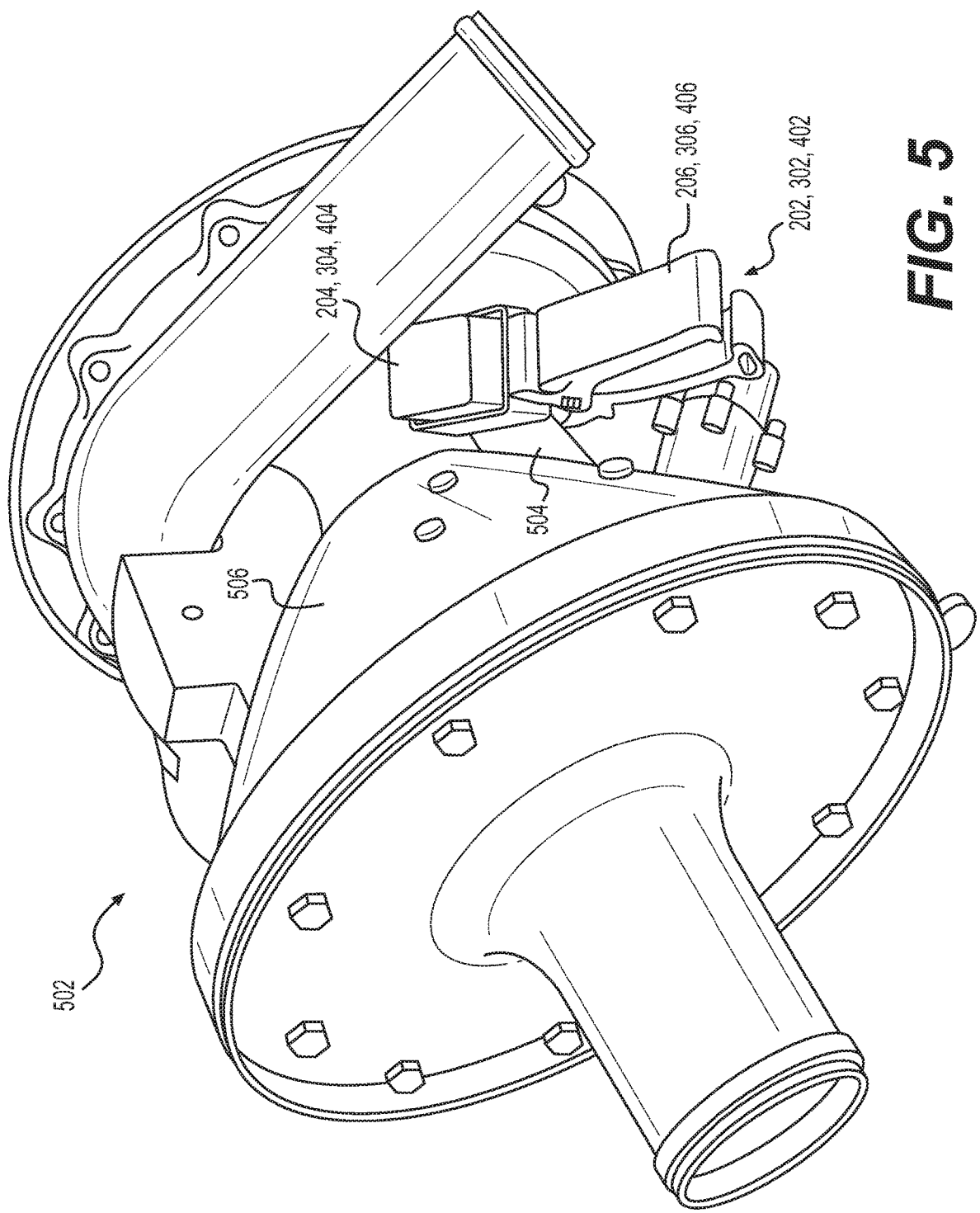
FIG. 5 depicts the portable vibration sensor mounted on a rotating machine isolated from a vehicle of the system of FIG. 1.

One or more vehicles 110, such as one or more aircraft, may connect to ground system 102 through network 108. Each vehicle 110 may have at least one rotating machine 502 (as shown in FIG. 5) mounted to or within the respective vehicle 110. For example, each aircraft 110 may include a rotating machine 502, such as a vacuum blower mounted in the aircraft 110 for use in a waste system of the aircraft 110, as further detailed below. Each vehicle 110 may further collect and send data to ground system 102 through network 108. In one embodiment, each vehicle 110 may send vibration data of a respective rotating machine 502 (collected via a portable vibration sensor 202, 302, 402 as detailed below) to ground system 102 through network 108. Ground system 102 (via server system 104) may receive the data from each aircraft 110 through network 108. In one embodiment, a user, such as a maintenance technician, may use an application 700 on a mobile computing device 112 to collect vibration data of the rotating machine 502 from the portable vibration sensor 202, 302, 402. The user may then send the vibration data to ground system 102 from the mobile computing device 112 through network 108.

Figure 8B:
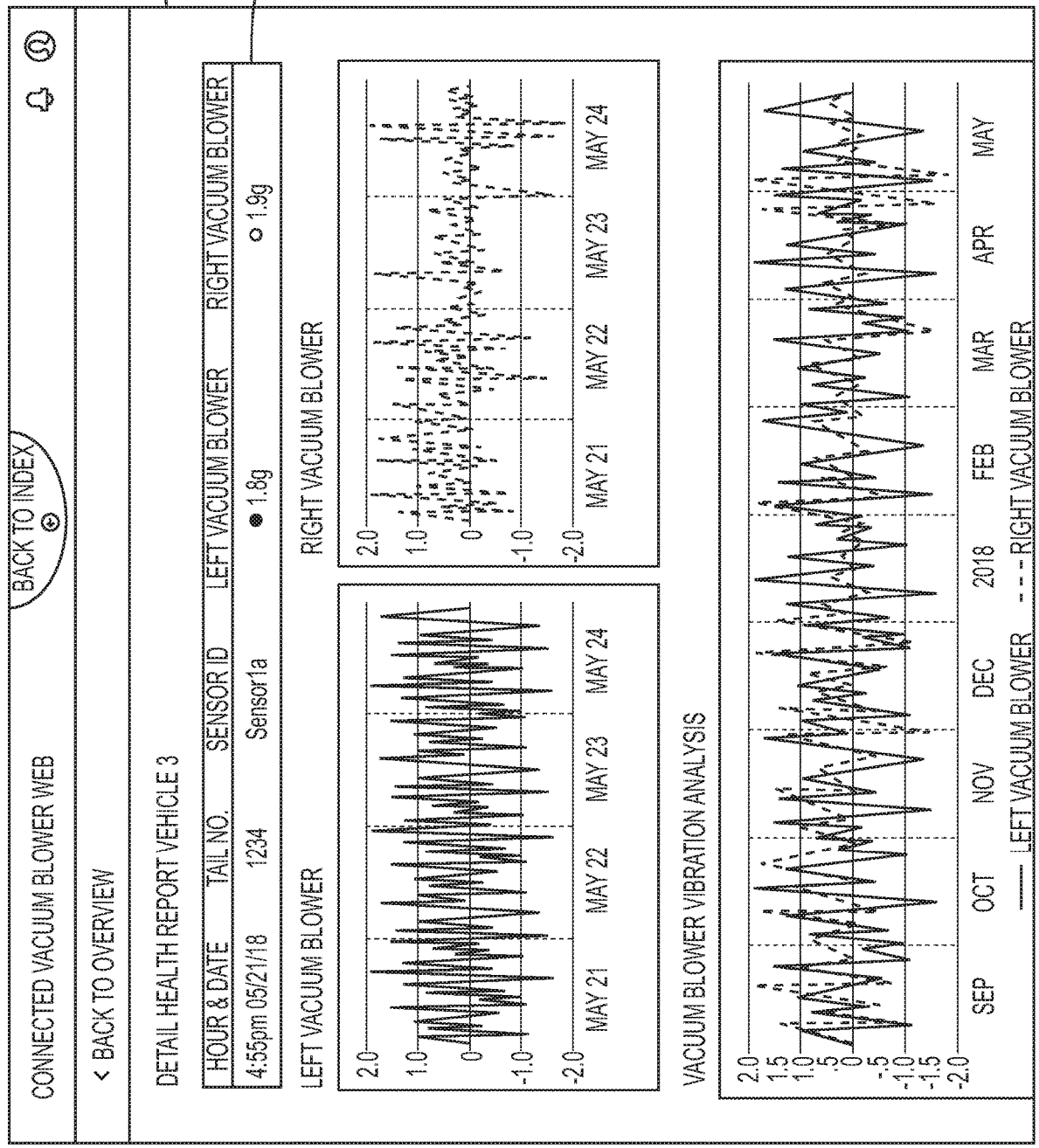

Ground system 102 may further process and perform analytics on the data to generate one or more health reports 802 for the rotating machine 502 of each aircraft 110 for transmission to and display on the one or more mobile computing devices 112, as further detailed below. The health reports 802 may be accessed by users via a web portal 800 through network 108 (as shown in FIGS. 8A-8B).

FIGS. 2-4 depict various embodiments of an exemplary portable vibration sensor 202, 302, 402, respectively, of system 100. As shown in FIG. 2, portable vibration sensor 202 may include a vibration sensor 204 mounted in clamps 206 for placing the portable vibration sensor 202 on a respective rotating machine 502. Vibration sensor 204 may be an accelerometer, such as a piezoelectric accelerometer, piezoresistive accelerometer, capacitive accelerometer, thermal (or convective) accelerometer, or the like. Vibration sensor 204 may be powered by a battery or the like. In one embodiment, vibration sensor 204 may harvest energy from vibrations of rotating machine 502, such as via a piezoelectric device. Vibration sensor 204 may include a wireless transceiver for wirelessly communicating with a mobile computing device 112 and/or server system 104 of ground system 102. For example, vibration sensor 204 may communicate with the mobile computing device 112 and/or server system 104 via Bluetooth®, WiFi, radio, cellular, infrared, or any other type of wireless communication known in the art. As such, vibration sensor 204 may communicate with the mobile computing device 112 and/or server system 104 to send vibration data to mobile computing device 112 and/or server system 104, as further detailed below.

Clamps 206 may include a first elongated member 208 and a second elongated member 210. First elongated member 208 may be pivotably coupled to second elongated member 210 at a pivot 212 by fastening means 214. Fastening means 214 may be a nut and bolt, pin, or the like. First elongated member 208 may include a jaw 216 at a front end portion 217 thereof, a handle 218 at a rear end portion 219, and a middle portion 220 between jaw 216 and handle 218. Similarly, second elongated member 210 may include a jaw 222 at a front end portion 223 thereof, a handle 224 at a rear end portion 225, and a middle portion 226 between jaw 222 and handle 224.

Jaw 216 may include a flat portion 228 and jaw 222 may include a flat portion 230 spaced from, and facing, flat portion 228 of jaw 216 for biasing a surface of rotating machine 502, as further detailed below. Jaw 222 may further include an opening 232 located on an opposite side of flat portion 230 for receiving vibration sensor 204. Opening 232 may include a size and shape corresponding to vibration sensor 204 such that vibration sensor 204 may be press fit into opening 232. For example, opening 232 may include a generally rectangular shape corresponding to a rectangular shape of vibration sensor 204. It is understood that opening 232 may be any size or shape necessary for press fitting vibration sensor 204 into opening 232. In one embodiment, vibration sensor 204 may be secured in opening 232 by fastening means (not shown), such as nut and bolt, pin, adhesive, or any other fastening means known in the art for securing vibration sensor 204 in opening 232.

Pivot 212 may be located at middle portions 220 and 226 of first and second elongated members 208 and 210. Pivot may include a compression spring (not shown) between first elongated member 208 and second elongated member 210 for resiliently biasing handles 218 and 224 to an open position such that jaw 216 and jaw 222 are spaced apart to be placed on a surface. Pivot 212 may further include a locking mechanism (not shown) for locking clamps 206 in a closed position when flat portions 228 and 230 of jaws 216 and 222 are secured on respective surfaces of rotating machine 502. As such, handle 218 of first elongated member 208 may further include an actuator mechanism 234 for actuating the locking mechanism between a locked position and an unlocked position. It is understood that any type of spring, such as a leaf spring, may be used at pivot 212 for resiliently biasing handles 218 and 224 to an open position. In one embodiment, handle 218 may also include an aperture 236 for securing (e.g., by a clip or the like) clamps 206 onto, for example, a tool belt, a belt loop, a bag, or the like.

Middle portions 220 and 226 may each include a bore (not shown) for receiving fastening means 214 to secure first elongated member 208 to second elongated member 210. For example, middle portions 220 and 226 may be sized and shaped such that middle portion 220 of first elongated member 208 is received by middle portion 226 of second elongated member 210. The bores of middle portions 220 and 226 may be aligned such that fastening means 214 may be placed into each of the bores and secured (e.g., by a nut). Thus, first elongated member 208 may be pivotably coupled to second elongated member 210.

Clamps 206 may include a shape and design for ergonomics while being held by a user and for saving space for storage, for example, on a tool belt of the user. As such, handles 218 and 224 may include a curvature (as shown in FIG. 2) for easily and comfortably fitting into the user's hand. Thus, handles 218 and 224 may be spaced apart from each other.

As shown in FIG. 3, portable vibration sensor 302 may include a vibration sensor 304 mounted in clamps 306 for placing the portable vibration sensor 302 on a respective rotating machine 502. Vibration sensor 304 may be powered by a battery or the like. In one embodiment, vibration sensor 304 may harvest energy from vibrations of rotating machine 502, such as via a piezoelectric device. Vibration sensor 304 may include a wireless transceiver for wirelessly communicating with a mobile computing device 112 and/or server system 104 of ground system 102. For example, vibration sensor 304 may communicate with the mobile computing device 112 and/or server system 104 via Bluetooth®, WiFi, radio, cellular, infrared, or any other type of wireless communication known in the art. As such, vibration sensor 304 may communicate with the mobile computing device 112 and/or server system 104 to send vibration data to the mobile computing device 112 and/or server system 104, as further detailed below.

Clamps 306 may include a first elongated member 308 and a second elongated member 310. First elongated member 308 may be pivotably coupled to second elongated member 310 at a pivot 312 by fastening means 314. Fastening means 314 may include a nut and bolt, pin, or the like. First elongated member 308 may include a jaw 316 at a front end portion 317 thereof, a handle 318 at a rear end portion 319, and a middle portion 320 between jaw 316 and handle 318. Similarly, second elongated member 310 may include a jaw 322 at a front end portion 323 thereof, a handle 324 at a rear end portion 325, and a middle portion 326 between jaw 322 and handle 324.

Jaw 316 may include a flat portion 328 and jaw 322 may include a flat portion 330 spaced from, and facing, flat portion 328 of jaw 316 for biasing a surface of rotating machine 502, as further detailed below. Jaw 322 may further include an opening 332 located on an opposite side of flat portion 330 for receiving vibration sensor 304. Opening 332 may include a size and shape corresponding to vibration sensor 304 such that vibration sensor 304 may be press fit into opening 332. For example, opening 332 may include a generally rectangular shape corresponding to a rectangular shape of vibration sensor 304. It is understood that opening 332 may be any size or shape necessary for press fitting vibration sensor 304 into opening 332. In one embodiment, vibration sensor 304 may be secured in opening 332 by fastening means (not shown), such as nut and bolt, pin, adhesive, or any other fastening means known in the art for securing vibration sensor 304 in opening 332.

Pivot 312 may be located at middle portions 320 and 326 of first and second elongated members 308 and 310. Pivot may include a compression spring (not shown) between first elongated member 308 and second elongated member 310 for resiliently biasing handles 318 and 324 to an open position such that jaw 316 and jaw 322 are spaced apart to be placed on a surface. Pivot 312 may further include a locking mechanism (not shown) for locking clamps 306 in a closed position when flat portions 328 and 330 of jaws 316 and 322 are secured on respective surfaces of rotating machine 502. As such, handle 318 of first elongated member 308 may further include an actuator mechanism 334 for actuating the locking mechanism between a locked position and an unlocked position. It is understood that any type of spring, such as a leaf spring, may be used at pivot 312 for resiliently biasing handles 318 and 324 to an open position. In one embodiment, handle 324 may also include an aperture 336 for securing (e.g., by a clip or the like) clamps 306 onto, for example, a tool belt, a belt loop, a bag, or the like.

Middle portions 320 and 326 may each include a bore (not shown) for receiving fastening means 314 to secure first elongated member 308 to second elongated member 310. For example, handle 324 may include an aperture 327 for receiving handle 318. Further, middle portions 320 and 326 may be sized and shaped such that middle portion 320 of first elongated member 308 is received by middle portion 326 of second elongated member 310. The bores of middle portions 320 and 326 may be aligned such that fastening means 314 may be placed into each of the bores and secured (e.g., by a nut). When handles 318 and 324 are compressed to the closed position, handle 218 may be compressed into aperture 327 of handle 324. Thus, first elongated member 308 may be pivotably coupled to second elongated member 310.

Clamps 306 may include a shape and design for ergonomics while being held by a user and for saving space for storage, for example, on a tool belt of the user. As such, handles 318 and 324 may include a flat design (as shown in FIG. 3) to reduce an overall size of clamps 306.

As shown in FIG. 4, portable vibration sensor 402 may include a vibration sensor 404 mounted in clamps 406 for placing the portable vibration sensor 402 on a respective rotating machine 502. Vibration sensor 404 may be powered by a battery or the like. In one embodiment, vibration sensor 404 may harvest energy from vibrations of rotating machine 502, such as via a piezoelectric device. Vibration sensor 404 may include a wireless transceiver for wirelessly communicating with a mobile computing device 112 and/or server system 104 of ground system 102. For example, vibration sensor 404 may communicate with the mobile computing device 112 and/or server system 104 via Bluetooth®, WiFi, radio, cellular, infrared, or any other type of wireless communication known in the art. As such, vibration sensor 404 may communicate with the mobile computing device 112 and/or server system 104 to send vibration data to the mobile computing device 112 and/or server system 104, as further detailed below.

Clamps 406 may include a first elongated member 408 and a second elongated member 410. First elongated member 408 may be pivotably coupled to second elongated member 410 at a pivot 412 by fastening means 414. Fastening means 414 may be a nut and bolt, pin, or the like. First elongated member 408 may include a jaw 416 at a front end portion 417 thereof, a handle 418 at a rear end portion 419, and a middle portion 420 between jaw 416 and handle 418. Similarly, second elongated member 410 may include a jaw 422 at a front end portion 423 thereof, a handle 424 at a rear end portion 425, and a middle portion 426 between jaw 422 and handle 424.

Jaw 416 may include a flat portion 428 and jaw 422 may include a flat portion 430 spaced from, and facing, flat portion 428 of jaw 416 for biasing a surface of rotating machine 502, as further detailed below. Jaw 416 may further include an opening 432 located on an opposite side of flat portion 428 for receiving vibration sensor 404. Opening 432 may include a size and shape corresponding to vibration sensor 404 such that vibration sensor 404 may be press fit into opening 432. For example, opening 432 may include a generally rectangular shape corresponding to a rectangular shape of vibration sensor 404. It is understood that opening 432 may be any size or shape necessary for press fitting vibration sensor 404 into opening 432. In one embodiment, vibration sensor 404 may be secured in opening 432 by fastening means (not shown), such as nut and bolt, pin, adhesive, or any other fastening means known in the art for securing vibration sensor 404 in opening 432.

Pivot 412 may be located at middle portions 420 and 426 of first and second elongated members 408 and 410. Pivot may include a compression spring (not shown) between first elongated member 408 and second elongated member 410 for resiliently biasing handles 418 and 424 to an open position such that jaw 416 and jaw 422 are spaced apart to be placed on a surface. Pivot 412 may further include a locking mechanism (not shown) for locking clamps 406 in a closed position when flat portions 428 and 430 of jaws 416 and 422 are secured on respective surfaces of rotating machine 502. As such, handle 418 of first elongated member 408 may further include an actuator mechanism 434 for actuating the locking mechanism between a locked position and an unlocked position. It is understood that any type of spring, such as a leaf spring, may be used at pivot 412 for resiliently biasing handles 418 and 424 to an open position. In one embodiment, handle 418 may also include an aperture 436 for securing (e.g., by a clip or the like) clamps 406 onto, for example, a tool belt, a belt loop, a bag, or the like.

Middle portions 420 and 426 may each include a bore (not shown) for receiving fastening means 414 to secure first elongated member 408 to second elongated member 410. For example, middle portion 420 of first elongated member 408 may include an opening 437 for receiving middle portion 426 of second elongated member 410. As such, second elongated member 410 may extend through opening 437 when coupled to first elongated member 408 such that first elongated member 408 and second elongated member 410 form a generally "X" shape when coupled together. The bores of middle portions 420 and 426 may be aligned such that fastening means 414 may be placed into each of the bores and secured (e.g., by a nut). Thus, first elongated member 408 may be pivotably coupled to second elongated member 410.

Clamps 406 may include a shape and design for ergonomics while being held by a user and for saving space for storage, for example, on a tool belt of the user. As such, handles 418 and 424 may include a curvature (as shown in FIG. 4) for easily and comfortably fitting into the user's hand. As such, handles 418 and 424 may be spaced apart from each other.

FIG. 5 depicts the portable vibration sensor 202, 302, 402 mounted on a rotating machine 502 isolated from a vehicle 110 of system 100. In the exemplary embodiment, rotating machine 502 may be a vacuum blower for a waste system of a vehicle 110, such as an aircraft. A user, such as a maintenance technician, may board a respective vehicle 110 (e.g., an aircraft) while the vehicle 110 is parked (e.g., during a maintenance check). For example, when the vehicle 110 is an aircraft, the user may board the aircraft while the aircraft is on the ground. The user may mount a portable vibration sensor 202, 302, 402 onto a flat surface 504 of the rotating machine 502. Flat surface 504 may be located adjacent a housing 506 of rotating machine 502. To prevent the portable vibration sensor 202, 302, 402 from moving during operation of rotating machine 502, the user may place the portable vibration sensor 202, 302, 402 such that it is spaced from housing 506 (e.g., by at least 0.5 inches). Further, the user may clean the portable vibration sensor 202, 302, 402 of any foreign object debris prior to mounting the portable vibration sensor 202, 302, 402 on the rotating machine 502.

The user may use an application 700 on a mobile computing device 112 to begin a test of the rotating machine 502, as further detailed below (with reference to FIGS. 7A-7G). The portable vibration sensor 202, 302, 402 may measure and collect vibration data of the rotating machine 502 during the test. In one embodiment, portable vibration sensor 202, 302, 402 may be powered by a battery and may turn on (e.g., wake up) when vibration frequency of the rotating machine 502 reaches a predetermined threshold. In one embodiment, portable vibration sensor 202, 302, 402 may wirelessly communicate with the mobile computing device 112 to send vibration data to the mobile computing device 112 via application 700. For example, portable vibration sensor 202, 302, 402 may be in communication with mobile computing device 112 via Bluetooth®, Wi-Fi, radio, cellular, infrared, or any other type of wireless or wired communication known in the art. The mobile computing device 112 (via application 700) may then send the vibration data to server system 104 through network 108. In one embodiment, the portable vibration sensor 202, 302, 402 may be wirelessly connected to network 108 (e.g., via Wi-Fi, radio, cellular, or the like). As such, server system 104 may receive the vibration data directly from the portable vibration sensor 202, 302, 402 through network 108. Server system 104 may generate a health report 802 for rotating machine 502 based on the received vibration data, as further detailed below.

In one embodiment, server system 104 may generate an alert if the received vibration data exceeds a predetermined threshold value of known vibration data for the rotating machine 502. For example, server system 104 may compare the received vibration data (e.g., from the test) with known vibration data for a respective rotating machine 502 and generate an alert if the received vibration data exceeds a predetermined threshold value of the known vibration data. The known vibration data may be collected during trial tests of rotating machine 502 prior to rotating machine 502 being installed on a respective vehicle 110. For example, technicians may perform trial tests on rotating machine 502 to pre-measure vibration frequency data of rotating machine 502. Server system 104 may receive the pre-measured vibration frequency data. Server system 104 may correlate peaks of the pre-measured vibration frequency data for the rotating machine 502 to determine the vibration values that correspond to a failure condition of rotating machine 502. For example, the peaks of the pre-measured vibration frequency data may correspond to failure conditions such as clogs, leaks, or damage to certain components (e.g., fans, bearings, etc.) of rotating machine 502. Server system 104 may store the determined vibration values for the threshold value in one or more databases 106 as the predetermined threshold value of the known vibration data for a respective rotating machine 502. Thus, server system 104 may determine if the received vibration data (e.g., measured during a test of rotating machine 502) exceeds the threshold value of the known vibration data.

In one embodiment, the determined vibration values for the threshold value may indicate impending failure of a specific component of rotating machine 502 (e.g., a fan, a bearing, etc.). For example, the predetermined threshold value of known vibration data may include a plurality of threshold values. Each of the plurality of threshold values may correspond to a failure mode of a different component of rotating machine 502. As such, server system 104 may generate an alert to indicate a respective component of rotating machine 502 is failing if the received vibration data exceeds a respective threshold value corresponding to that component.

In one embodiment, server system 104 may provide a recommended corrective action to the user via application 700 and/or web portal 800. Based on the comparison of the received vibration data to the known vibration data, server system 104 may indicate a corrective action to mitigate the failure of rotating machine 502. For example, server system 104 may determine that rotating machine 502 and/or a component of the rotating machine 502 may need to be replaced based on the received vibration data and send a notification and/or alert to the user via application 700 and/or web portal 800. The notification and/or alert may indicate that rotating machine 502 and/or the component should be replaced. In one embodiment, server system 104 may determine that there is a clog in the rotating machine 502 (e.g., in the vacuum blower) based on the received vibration data and notify the user of the clog.

FIG. 6 depicts a flowchart of a method 600 for monitoring the health of a rotating machine 502 mounted on a vehicle 110. In an initial step 605, a processor of server system 104 may receive identifying information of the vehicle 110, the rotating machine 502, and a portable vibration sensor 202, 302, 402 mounted on the rotating machine 502. In one embodiment, the processor may receive the identifying information from application 700 on the mobile computing device 112.

In step 610, the processor may receive vibration data from the portable vibration sensor 202, 302, 402 during a test of the rotating machine 502, the received vibration data being associated with the identifying information of the vehicle 110, the rotating machine 502, and the portable vibration sensor 202, 302, 402. In one embodiment, the processor may receive the vibration data from application 700 on the mobile computing device 112

In step 615, the processor may compare the received vibration data with known vibration data for the rotating machine 502. In one embodiment, the processor of server system 104 may generate the known vibration data by pre-measured vibration data for the rotating machine during one or more trial tests of the rotating machine prior to the rotating machine being mounted on the vehicle.

In step 620, the processor may generate an alert if the received vibration data exceeds a predetermined threshold value of the known vibration data by a predetermined threshold value. In one embodiment, the processor of server system 104 may determine the predetermined threshold value of the known vibration data for the rotating machine by correlating peaks of the pre-measured vibration data to failure conditions of the rotating machine. In one embodiment, the predetermined threshold value of known vibration data may include a plurality of predetermined threshold values each corresponding to a failure condition of a different component of the rotating machine.

In step 625, the processor may generate a health report for the rotating machine 502 based on the received vibration data. The health report may include the received vibration data associated with the identifying information of the vehicle 110, the rotating machine 502, and the portable vibration sensor 202, 302, 402. The health report may further include the generated alert. In one embodiment, the processor may generate one or more alerts if the received vibration data exceeds one or more the plurality of predetermined threshold values of the known vibration data. The one or more generated alerts may each indicate a respective component of the rotating machine is failing. In one embodiment, the processor may determine a suggested corrective action for the user based on the comparing of the received vibration data with the known vibration data and transmit the suggested corrective action to the user. In one embodiment, the processor may generate one or more graphical representations of the received vibration data and the one or more graphical representations of the received vibration data may be included in the generated health report.

In step 630, the processor may transmit the health report to a user via a web portal. In one embodiment, the processor may transmit the health report to the user via email, text, or through application 700 on the mobile computing device 112.

Figure 7D:
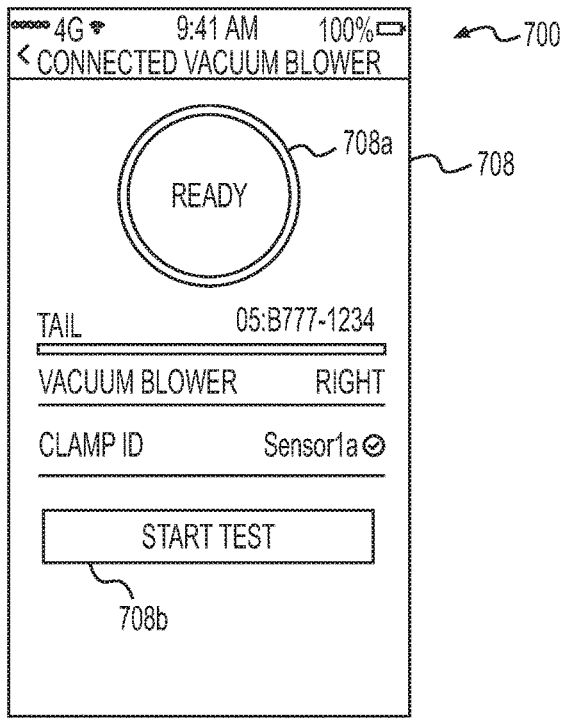

FIGS. 7A-7G depict an exemplary application 700 for a mobile computing device 112 used in the system 100 for monitoring the health of a rotating machine 502. In one embodiment, application 700 may be a connected rotating machine application. In the exemplary embodiment, application 700 may be a connected vacuum blower application. As shown in FIG. 7A, application 700 may include a login page 702. Login page 702 may enable a user, such as a maintenance technician, to login to the application 700. As such, login page 702 may include fields to input information. For example, login page 702 may include an email address field 702a and a password field 702b. Login page 702 may further include a sign in button 703. After the user inputs the login information, the user may select the sign in button 703 to login to application 700. For example, server system 104 may receive the login information (e.g., email address and password) of the user, verify the login information, and log the user in to the application 700.

As shown in FIG. 7B, application 700 may also include a select vehicle page 704. Select vehicle page 704 may enable the user to input the identifying information of the vehicle 110. For example, when the vehicle 110 is an aircraft, select vehicle page 704 may include a select tail number field 704a for selecting the tail number of the aircraft. However, any type of identifying information of a vehicle 110 may be used, such as serial number, license plate number, registration number, or the like. The select vehicle page 704 may further include a select rotating machine 704b field (e.g., a select vacuum blower field) for selecting the rotating machine 502 (e.g., vacuum blower) that is being tested (e.g., left or right vacuum blower). Select vehicle page 704 may further include a continue button 704c to continue to the next page after the vehicle 110 information has been entered. For example, server system 104 may receive the identity information of the vehicle 110 and the rotating machine 502 input by the user via application 700.

As shown in FIG. 7C, application 700 may further include an apply clamp page 706. Apply clamp page 706 may enable the user to input identifying information of the portable vibration sensor 202, 302, 402. For example, apply clamp page 706 may include a select clamp identifier field 706a for selecting or inputting the identifying information of the portable vibration sensor 202, 302, 402. The identifying information of the portable vibration sensor 202, 302, 402 may include a name of the sensor (e.g., Sensor1a), an identification number, a registration number, a serial number, or the like. Apply clamp page 706 may also include an image and/or video showing an example of how to place the portable vibration sensor 202, 302, 402 on the rotating machine 502. Apply clamp page 706 may further include a continue button 706c to continue to the next page after the portable vibration sensor 202, 302, 402 information has been entered. For example, server system 104 may receive the identity information of the portable vibration sensor 202, 302, 402 input by the user via application 700.

As shown in FIG. 7D, application 700 may further include a start test page 708. Start test page 708 may include a list of the identifying information entered on the select aircraft page 704 and the apply clamp page 706 to enable the user to verify that the identity information received by server system 104 is accurate. Start test page 708 may also include a ready indicator 708a for indicating that the identifying information has been received by the processor of server system 104 and the application 700 is ready to perform the test. Start test page 708 may further include a start test button 708b for starting a test on the rotating machine 502. For example, when the user selects the start test button 708b, server system 104 may begin a test via application 700. Server system 104 (via application 700) may run rotating machine 502 and receive vibration data from portable vibration sensor 202, 302, 402. In one embodiment, application 700 may run rotating machine 502 and receive vibration data from portable vibration sensor 202, 302, 402 on the mobile computing device 112 prior to sending the received vibration data to server system 104. Server system 104 may associate the received vibration data with the identity information of the vehicle 110, the portable vibration sensor 202, 302, 402, and the rotating machine 502. For example, the received vibration data may correspond to the vehicle 110 on which the rotating machine 502 being tested is mounted and may correspond to the portable vibration sensor 202, 302, 402 being used for the test.

Figure 7E:
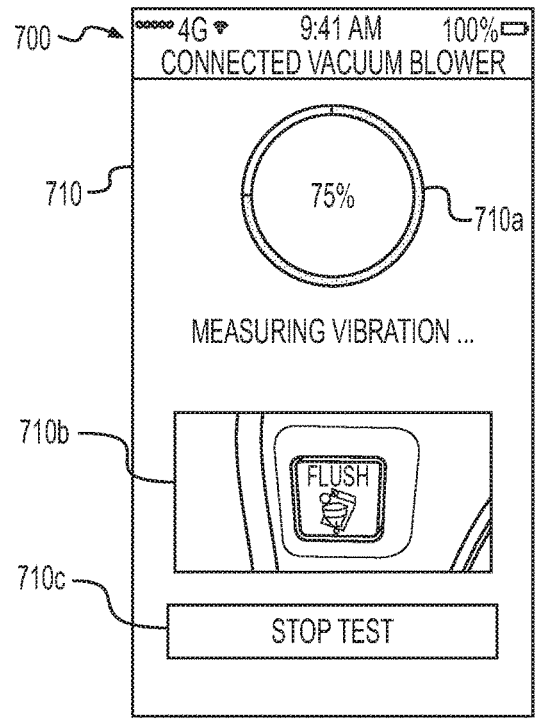

As shown in FIG. 7E, application 700 may include a test page 710. Test page 710 may include a test progress indicator 710a. Test progress indicator 710a may indicate a duration of time remaining for the test. The duration of time for a test may be predetermined and the test progress indicator 710a may indicate a percentage value of the duration of time the test has completed based on the predetermined duration of time for the test. For example, if the predetermined duration of time for a test is one minute, and 45 seconds have elapsed for the current test, test progress indicator 710a may indicate that 75% of the test has been completed. Test page 710 may also include an image 710b of a system or machine that the rotating machine 502 being tested is installed on. For example, when the rotating machine 502 is a vacuum blower of a waste system on an aircraft, the image 710b may be a waste system flushing mechanism. Test page 710 may further include a stop test button 710c for stopping a test in progress. For example, the user may select the stop test button 710c to stop the current test. When the user selects the stop test button 710c, server system 104 may stop the test such that the rotating machine 502 stops running and/or server system 104 stops receiving vibration data from portable vibration sensor 202, 302, 402 for the test.

Figure 7F:
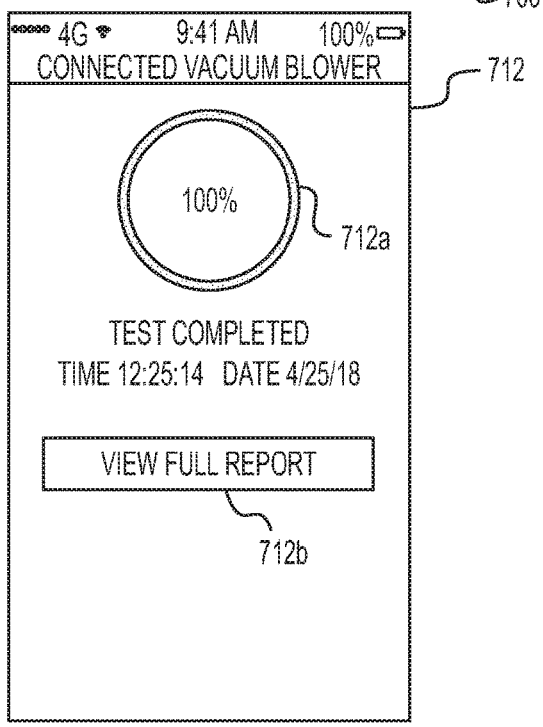

As shown in FIG. 7F, application 700 may further include a test complete page 712. Application 700 may display test complete page 712 when the current test is completed. As such test complete page 712 may include a test progress indicator 712a that indicates the test is 100% complete. Test complete page 712 may also include the current time and date that the test was completed. In one embodiment, when a test is completed, application 700 may collect and send the vibration data measured by portable vibration sensor 202, 302, 402 during the test to server system 104. Test complete page 712 may further include a view full report button 712b. When the user selects the view full report button 712b, server system 104 (via application 700) may display a generated health report for the rotating machine 502 on the mobile computing device 112.

Figure 7G:
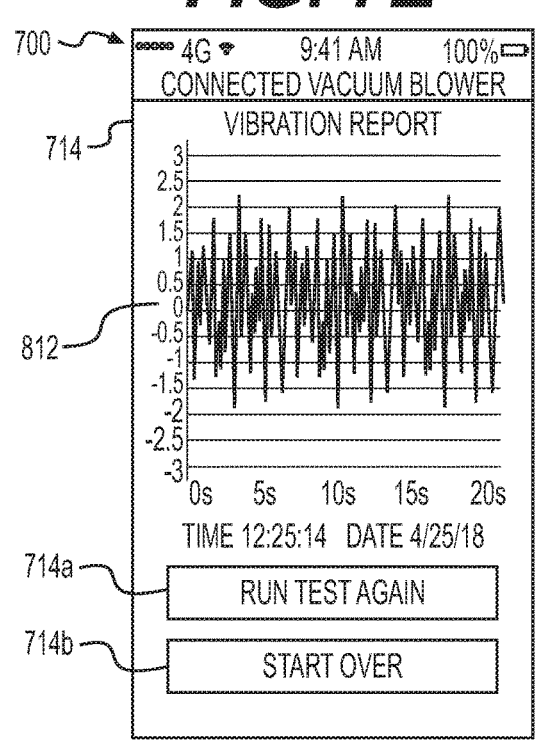

As shown in FIG. 7G, application 700 may further include a vibration report page 714 to display the generated health report for the rotating machine 502. The health report may be generated by method 600, as detailed above. The vibration report page 714 may also include a run test again button 714a and a start over button 714b. When the user selects the run test again button 714a, application 700 (or server system 104 via application 700) may restart the test, thus displaying the test page 710. When the user selects the start over again button 714b, application 700 (or server system 104 via application 700) may display the select vehicle page 704 to start the process again for enabling the user to select new information (e.g., when the user places the portable vibration sensor 202, 302, 402 on a different rotating machine 502 of a different vehicle 110).

FIGS. 8A and 8B depict an exemplary web portal 800 for displaying a health report of the rotating machine 502. As shown in FIG. 8A, web portal 800 may include a general health report 802a showing a drill-down dashboard of each vehicle 110 that has been tested. For example, the general health report 802a may include a vehicle type selector bar 804 for selecting a type of vehicle 110 to be displayed. The vehicle type may be, for example, type of aircraft, type of car, type of boat, type of spacecraft, etc. In the exemplary embodiment, the vehicle type selector bar 404 includes three different types of vehicles 110 (e.g., vehicle 1, vehicle 2, and vehicle 3). The general health report 802a may further include a table 806 for displaying status information for each rotating machine 502 that has been tested for a selected vehicle type. For example, table 806 may display the time and date of the test, the identifying information of the vehicle 110, the portable vibration sensor 202, 302, 402, and the rotating machine 502, and an average value of vibration for each rotating machine 502 measured during the test for each associated portable vibration sensor 202, 302, 402. In the exemplary embodiment, table 806 may display a tail number for each type of aircraft that has been tested, the sensor ID associated with each respective test, and the average vibration value for each rotating machine 502 on which the test was administered. General health report 802a may further include a view full report button 808 for displaying a detailed health report 802b for a respective vehicle 110. For example, when a user selects the view full report button 808 for a respective vehicle 110, web portal 800 may display the detailed health report 802b.

As shown in FIG. 8B, the detailed health report 802b may display general information 810 from the general health report 802a for the respective vehicle 110 (e.g., the time and date of the test, the identifying information of the vehicle 110, the portable vibration sensor 202, 302, 402, and the rotating machine 502 and the average value of vibration data for the test). The detailed health report 802b may further include one or more graphical representations 812 of the vibration data for each of the rotating machines 502 of the test. For example, the one or more graphical representations 412 may plot the vibration data in an acceleration (g) versus time (s) graph. However, it is understood that any type of graphical representation (e.g., frequency (kHz) vs. time (s), etc.) or general representation (e.g., charts, tables, etc.) of the vibration data may be utilized for displaying the vibration data for each rotating machine 502. The one or more graphical representations 812 may include vibration data measured for various tests including the most recent test. Detailed health report 802b may also include a graphical representation 814 of vibration data over a period of months. In the exemplary embodiment, when the rotating machine 502 includes a left vacuum blower and a right vacuum blower, the graphical representation 814 may combine the vibration data of the left vacuum blower and the right vacuum blower into a single graph.

In one embodiment, the health report 802 (e.g., the general health report 802a and/or the detailed health report 802b) may include a generated alert indicating failure of rotating machine 502, as detailed above. The generated alert may be displayed on the general health report 802a and/or the detailed health report 802b or may be sent to user via email, text, or push notification. The generated alert may include a color indicator for indicating a health of rotating machine 502. For example, green may indicate the rotating machine 502 is healthy (e.g., the received vibration data does not exceed the predetermined threshold value of known vibration data for the rotating machine 502). Yellow may indicate the rotating machine 502 is approaching failure (e.g., the received vibration data is near or minimally exceeds the predetermined threshold value of known vibration data for the rotating machine 502). Red may indicate the rotating machine 502 is failing or has failed (e.g., the received vibration data exceeds or greatly exceeds the predetermined threshold value of known vibration data for the rotating machine 502). It is understood that the alert may be any type of alert for indicating the health of rotating machine 502 is failing or has failed, such as any color, symbol, text, number, or the like.

Figure 9:
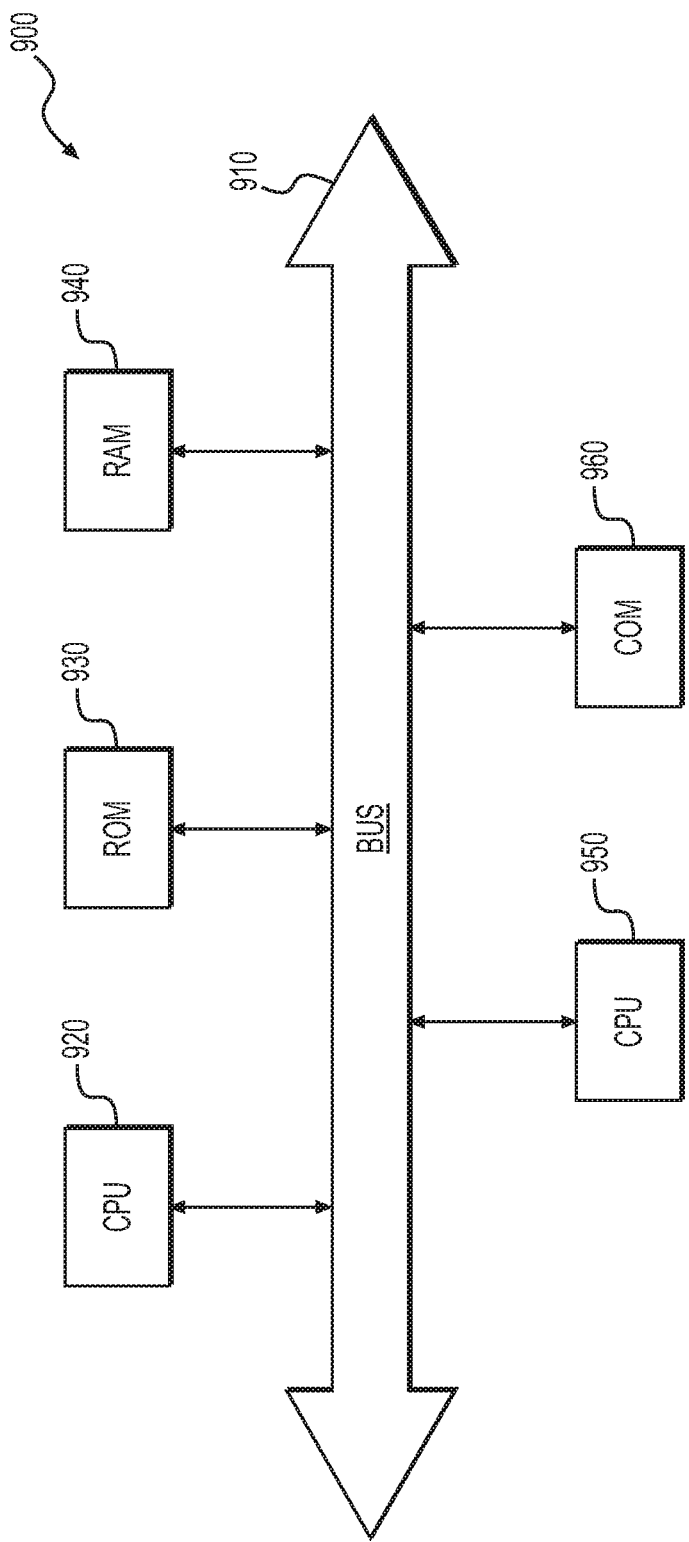
FIG. 9 depicts a high-level functional block diagram of an exemplary computer device or system, in which embodiments of the present disclosure, or portions thereof, may be implemented.

FIG. 9 depicts a high-level functional block diagram of an exemplary computer device or system, in which embodiments of the present disclosure, or portions thereof, may be implemented, e.g., as computer-readable code. For example, each of the exemplary systems, user interfaces and methods described above with respect to FIGS. 1-8B can be implemented in device 900 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-8B.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-8B may be implemented using device 900. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 9, device 900 may include a central processing unit (CPU) 920. CPU 920 may be any type of processor device including, for example, any type of special purpose or a general-purpose microprocessor device. As will be appreciated by persons skilled in the relevant art, CPU 920 also may be a single processor in a multi-core/multi-processor system, such system operating alone, or in a cluster of computing devices operating in a cluster or server farm. CPU 920 may be connected to a data communication infrastructure 910, for example, a bus, message queue, network, or multi-core message-passing scheme.

Device 900 may also include a main memory 940, for example, random access memory (RAM), and may also include a secondary memory 930. Secondary memory 930, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 930 may include other similar means for allowing computer programs or other instructions to be loaded into device 900. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 900.

Device 900 may also include a communications interface ("COM") 960. Communications interface 960 allows software and data to be transferred between device 900 and external devices. Communications interface 960 may include a modem, a network interface (such as an Ethernet card), a communications port, a PCMCIA slot and card, or the like. Software and data transferred via communications interface 960 may be in the form of signals, which may be electronic, electromagnetic, optical, or other signals capable of being received by communications interface 960. These signals may be provided to communications interface 960 via a communications path of device 900, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 900 also may include input and output ports 950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for monitoring the health of a rotating machine mounted on a vehicle, the method comprising:
   receiving, by a processor, identifying information of the vehicle, the rotating machine, and a portable vibration sensor mounted on the rotating machine, wherein the portable vibration sensor includes:
      a set of clamps having an opening for receiving a wireless vibration sensor; and
      a wireless vibration sensor mounted in the opening of the set of clamps,
   wherein the set of clamps are selectively clamped to the rotating machine;
   receiving, by the processor, vibration data from the portable vibration sensor during a test of the rotating machine, the received vibration data being associated with the identifying information of the vehicle, the rotating machine, and the portable vibration sensor;
   comparing, by the processor, the received vibration data with known vibration data for the rotating machine;
   generating, by the processor, an alert if the received vibration data exceeds a predetermined threshold value of the known vibration data;
   generating, by the processor, a health report for the rotating machine based on the received vibration data, the health report including the received vibration data associated with the identifying information of the vehicle, the rotating machine, and the portable vibration sensor, wherein the health report further includes the generated alert; and
   transmitting, by the processor, the health report to a user via a web portal.

2. The method of claim 1, wherein the receiving, by the processor, the identifying information of the vehicle, the rotating machine, and the portable vibration sensor mounted on the rotating machine includes:
   receiving, by the processor, the identifying information from an application on a mobile computing device.

3. The method of claim 2, wherein the receiving, by the processor, the vibration data from the portable vibration sensor during the test of the rotating machine includes:
   receiving, by the processor, the vibration data from the application on the mobile computing device.

4. The method of claim 1, further comprising:
   determining, by the processor, the predetermined threshold value of the known vibration data for the rotating machine by correlating peaks of pre-measured vibration data for the rotating machine to failure conditions of the rotating machine,
   wherein the pre-measured vibration data for the rotating machine is measured during one or more trial tests of the rotating machine to generate the known vibration data for the rotating machine prior the rotating machine being mounted on the vehicle.

5. The method of claim 4, wherein the predetermined threshold value of the known vibration data includes a plurality of predetermined threshold values each corresponding to a failure condition of a different component of the rotating machine.

6. The method of claim 5, wherein the generating, by the processor, the alert if the received vibration data exceeds the predetermined threshold value of the known vibration data includes:

generating, by the processor, one or more alerts if the received vibration data exceeds one or more of the plurality of predetermined threshold values of the known vibration data,
  wherein the one or more alerts each indicate a respective component of the rotating machine is failing.
7. The method of claim 1, further comprising:
  determining, by the processor, a suggested corrective action for the user based on the comparing of the received vibration data with the known vibration data; and
  transmitting, by the processor, the suggested corrective action to the user.
8. The method of claim 1, wherein the generated health report includes one or more graphical representations of the received vibration data.
9. The method of claim 1, wherein the vehicle is an aircraft and the rotating machine is a vacuum blower of a waste system onboard the aircraft.
10. A system for monitoring the health of a rotating machine mounted on a vehicle, the system comprising:
  a memory having processor-readable instructions therein; and
  at least one processor configured to access the memory and execute the processor-readable instructions, which when executed by the processor configures the processor to perform a plurality of functions, including functions for:
    receiving, by the processor, identifying information of the vehicle, the rotating machine, and a portable vibration sensor mounted on the rotating machine, wherein the portable vibration sensor includes:
      a set of clamps having an opening for receiving a wireless vibration sensor; and
      a wireless vibration sensor mounted in the opening of the set of clamps,
    wherein the set of clamps are selectively clamped to the rotating machine;
    receiving, by the processor, vibration data from the portable vibration sensor during a test of the rotating machine, the received vibration data being associated with the identifying information of the vehicle, the rotating machine, and the portable vibration sensor;
    comparing, by the processor, the received vibration data with known vibration data for the rotating machine;
    generating, by the processor, an alert if the received vibration data exceeds a predetermined threshold value of the known vibration data;
    generating, by the processor, a health report for the rotating machine based on the received vibration data, the health report including the received vibration data associated with the identifying information of the vehicle, the rotating machine, and the portable vibration sensor, wherein the health report further includes the generated alert; and
    transmitting, by the processor, the health report to a user via a web portal.
11. The system of claim 10, wherein the receiving, by the processor, the identifying information of the vehicle, the rotating machine, and the portable vibration sensor mounted on the rotating machine includes:
  receiving, by the processor, the identifying information from an application on a mobile computing device.
12. The system of claim 11, wherein the receiving, by the processor, the vibration data from the portable vibration sensor during the test of the rotating machine includes:
  receiving, by the processor, the vibration data from the application on the mobile computing device.
13. The system of claim 10, wherein the plurality of functions further include functions for:
  determining, by the processor, the predetermined threshold value of the known vibration data for the rotating machine by correlating peaks of pre-measured vibration data for the rotating machine to failure conditions of the rotating machine,
  wherein the pre-measured vibration data for the rotating machine is measured during one or more trial tests of the rotating machine to generate the known vibration data for the rotating machine prior the rotating machine being mounted on the vehicle.
14. The system of claim 13, wherein the predetermined threshold value of the known vibration data includes a plurality of predetermined threshold values each corresponding to a failure condition of a different component of the rotating machine.
15. The system of claim 14, wherein the generating, by the processor, the alert if the received vibration data exceeds the predetermined threshold value of the known vibration data includes:
  generating, by the processor, one or more alerts if the received vibration data exceeds one or more of the plurality of predetermined threshold values of the known vibration data,
  wherein the one or more alerts each indicate a respective component of the rotating machine is failing.
16. The system of claim 10, wherein the plurality of functions further include functions for:
  determining, by the processor, a suggested corrective action for the user based on the comparing of the received vibration data with the known vibration data; and
  transmitting, by the processor, the suggested corrective action to the user.
17. The system of claim 10, wherein the generated health report includes one or more graphical representations of the received vibration data.
18. A non-transitory computer-readable medium containing instructions for monitoring the health of a rotating machine mounted on a vehicle, comprising:
  receiving, by a processor, identifying information of the vehicle, the rotating machine, and a portable vibration sensor mounted on the rotating machine, wherein the portable vibration sensor includes:
    a set of clamps having an opening for receiving a wireless vibration sensor; and
    a wireless vibration sensor mounted in the opening of the set of clamps,
  wherein the set of clamps are selectively clamped to the rotating machine;
  receiving, by the processor, vibration data from the portable vibration sensor during a test of the rotating machine, the received vibration data being associated with the identifying information of the vehicle, the rotating machine, and the portable vibration sensor;
  comparing, by the processor, the received vibration data with known vibration data for the rotating machine;
  generating, by the processor, an alert if the received vibration data exceeds a predetermined threshold value of the known vibration data;
  generating, by the processor, a health report for the rotating machine based on the received vibration data, the health report including the received vibration data associated with the identifying information of the vehicle, the rotating machine, and the portable vibration sensor, wherein the health report further includes the generated alert; and transmitting, by the processor, the health report to a user via a web portal.

19. The non-transitory computer-readable medium of claim 18, wherein the instructions further include:

determining, by the processor, the predetermined threshold value of the known vibration data for the rotating machine by correlating peaks of pre-measured vibration data for the rotating machine to failure conditions of the rotating machine, wherein the pre-measured vibration data for the rotating machine is measured during one or more trial tests of the rotating machine to generate the known vibration data for the rotating machine prior the rotating machine being mounted on the vehicle.

20. The non-transitory computer-readable medium of claim 19, wherein the predetermined threshold value of the known vibration data includes a plurality of predetermined threshold values each corresponding to a failure condition of a different component of the rotating machine.

\* \* \* \* \*